US012773784B2

(12) United States Patent
Kim et al.

(10) Patent No.: US 12,773,784 B2
(45) Date of Patent: Oct. 27, 2026

(54) AUTOMATED GAS SUPPLY SYSTEM INCLUDING MOBILE ROBOT

(71) Applicant: KC CO., LTD., Gyeonggi-do (KR)

(72) Inventors: Sang Jin Kim, Gyeonggi-do (KR); Nam Eung Kim, Gyeonggi-do (KR); Yong Geon Park, Gyeonggi-do (KR); Young Hoon Kim, Gyeonggi-do (KR); Jung Hoon Lee, Gyeonggi-do (KR); Du Seok Lee, Gyeonggi-do (KR); Jong Chan Kim, Gyeonggi-do (KR)

(73) Assignee: KC CO., LTD., Gyeonggi-do (KR)

( * ) Notice: Subject to any disclaimer, the term of this patent is extended or adjusted under 35 U.S.C. 154(b) by 0 days.

(21) Appl. No.: 18/969,278

(22) Filed: Dec. 5, 2024

(65) Prior Publication Data

US 2025/0189078 A1 Jun. 12, 2025

(30) Foreign Application Priority Data

Dec. 8, 2023 (KR) ........................ 10-2023-0177861

(51) Int. Cl.

| | |
|---|---|
| ***B25J 9/16*** | (2006.01) |
| ***B25J 15/00*** | (2006.01) |
| ***F17C 7/00*** | (2006.01) |
| ***G05D 1/689*** | (2024.01) |

(52) U.S. Cl.

CPC ............. *B25J 9/1679* (2013.01); *B25J 9/162* (2013.01); *B25J 9/1687* (2013.01); *B25J 9/1697* (2013.01); *B25J 15/0019* (2013.01); *F17C 7/00* (2013.01); *G05D 1/6895* (2024.01); *F17C 2250/038* (2013.01)

(58) Field of Classification Search

CPC . B25J 9/162; B25J 9/1679; F17C 7/00; F17C 2250/038

See application file for complete search history.

(56) References Cited

U.S. PATENT DOCUMENTS

| | | | | |
|---|---|---|---|---|
| 9,765,932 | B2 * | 9/2017 | Rado | F17C 13/04 |
| 12,214,491 | B2 * | 2/2025 | Byeon | B25J 19/023 |
| 2021/0222834 | A1 * | 7/2021 | Choi | F17C 13/04 |
| 2023/0027130 | A1 * | 1/2023 | Simard | B25J 9/1666 |

FOREIGN PATENT DOCUMENTS

| | | |
|---|---|---|
| JP | 2018118341 | 8/2018 |
| JP | 2016153290 | 9/2019 |
| KR | 20210014059 | 2/2021 |
| KR | 20220008988 | 1/2022 |
| KR | 20220136929 | 10/2022 |
| TW | 202234511 | 9/2022 |
| TW | 202330376 | 8/2023 |

* cited by examiner

*Primary Examiner* — Timothy L Maust

(74) *Attorney, Agent, or Firm* — JCIPRNET

(57) ABSTRACT

A gas supply system includes a cabinet forming an internal space where a gas container is disposed, a fastening device movably installed in the internal space and fastened to a valve of the gas container in a state of being aligned with the valve, and a mobile robot device movable outside the cabinet, detachably connected to the fastening device, and configured to move the fastening device in a state of being connected to the fastening device.

17 Claims, 11 Drawing Sheets

AUTOMATED GAS SUPPLY SYSTEM INCLUDING MOBILE ROBOT

CROSS-REFERENCE TO RELATED APPLICATION

This application claims the benefit of Korean Patent Application No. 10-2023-0177861 filed on Dec. 8, 2023, in the Korean Intellectual Property Office, the entire disclosures of which are incorporated herein by reference for all purposes.

BACKGROUND

1. Field of the Invention

The following embodiments relate to an automated gas supply system including a mobile robot.

2. Description of the Related Art

In general, for a process that uses gas, for example, a process in which precise tasks are performed, such as a semiconductor manufacturing process, it is required to supply an appropriate type of gas for each process while satisfying a predetermined concentration and pressure.

For efficient gas supply during the process, various types of gases are stored in gas containers under high pressure, and gas containers holding gases with substances harmful to the human body are stored unmanned under strict management.

A gas container is connected to a gas supply device to discharge the gas stored therein, and when the gas in the gas container is completely exhausted, a series of replacement operations of disconnecting the gas supply device from a valve of the gas container, removing the gas container, and connecting a new gas container to the gas supply device are performed.

Meanwhile, to connect the gas supply device to the gas container, the valve of the gas container and the gas supply device need to be aligned. However, since it is difficult to align the gas container at the desired position due to its great weight, the gas supply device is aligned with respect to the valve of the gas container. The gas supply device includes an actuator for adjusting its position and receiving power for operation, and thus, it is required to form a cabinet, where the gas supply is performed, in a size to accommodate the gas supply device.

The above description is information the inventor(s) acquired during the course of conceiving the present disclosure, or already possessed at the time, and is not necessarily art publicly known before the present application was filed.

SUMMARY

An embodiment is intended to provide an automated gas supply device miniaturized by positioning a power source outside.

An embodiment is intended to provide an automated gas supply device that may be aligned with respect to a gas container through three-dimensional (3D) mapping through a mobile robot.

According to an aspect, there is provided a gas supply system including a cabinet in which a gas container is disposed, a fastening device configured to detach an end cap from a valve of the gas container or fasten a valve connector to the valve of the container, and a mobile robot device disposed outside the cabinet and connected to the fastening device to operate the fastening device. The mobile robot device may include a body movable along a ground, a first robot arm installed on the body, the first robot arm having a multi-degree-of-freedom motion, a docking module disposed at an end portion of the first robot arm and detachably fastened to the fastening device, a three-dimensional (3D) vision camera configured to collect an image, and a controller configured to control an operation of the first robot arm based on the image collected by the 3D vision camera.

The controller may be configured to determine one or more alignment positions of the docking module according to a set algorithm, and control an operation of the first robot arm so that the docking module is positioned at the determined one or more alignment positions. The set algorithm may be configured to generate in real time a 3D model of the gas supply system in a virtual space based on the image collected through the 3D vision camera, determine an image similarity by comparing the generated 3D model of the gas supply system with a set reference model, and determine a predicted position of the docking module at which the image similarity is greater than or equal to a set value to be an alignment position of the docking module.

The controller may be configured to adjust 3D coordinates and a 3D rotation angle of the docking module by operating the first robot arm so that the docking module is positioned at the determined alignment position.

The docking module may be fastenable to the fastening device in a fastening state of being relatively aligned with respect to the fastening device, and the controller may be configured to determine a first alignment position at which the docking module is in the fastening state with respect to the fastening device, during a process of connecting the docking module to the fastening device.

The fastening device may be configured to detach the end cap from the valve or mount the end cap on the valve, in a first state of being relatively aligned with respect to the valve of the gas container. The controller may be configured to determine a second alignment position of the docking module at which the fastening device is in the first state, in a state in which the docking module is fastened to the fastening device.

The fastening device may be configured to fasten the valve connector to the valve of the gas container to receive a gas in a second state of being relatively aligned with respect to the valve of the gas container. The controller may be configured to determine a third alignment position of the docking module at which the fastening device is in the second state, in a state in which the docking module is fastened to the fastening device.

The fastening device may include a docking portion disposed to be exposed on an outer surface of the fastening device so that the docking module is fastened thereto. The docking module may include a docking plate, a docking member disposed on a docking surface of the docking plate and fastened to the docking portion, and a power motor configured to supply power to the fastening device, in a state in which the docking module is fastened to the docking portion.

The docking portion may include a docking clamp to which the docking member is inserted and fastened, and a power transmitter into which a rotation shaft of the power motor is inserted, the power transmitter configured to receive power from the power motor.

The power motor may be installed on the docking plate so that the rotation shaft may penetrate through the docking plate and protrude from the docking surface.

The 3D vision camera may be disposed at an end portion of the first robot arm, and configured to acquire a front view image of the docking module that the docking surface of the docking plate faces.

The mobile robot device may further include a second robot arm installed on the body, the second robot arm having a multi-degree-of-freedom motion. The 3D vision camera may be disposed on the second robot arm.

According to an aspect, there is provided a gas supply system including a cabinet in which a gas container is disposed, a fastening device configured to detach an end cap from a valve of the gas container or fasten a valve connector to the valve of the container, in a state of being aligned with the valve of the gas container, and a mobile robot device movable outside the cabinet. The fastening device may include a docking portion disposed to be externally exposed. The mobile robot device may include a body movable along a ground, a first robot arm installed on the body, the first robot arm having a multi-degree-of-freedom motion, a docking module disposed at an end portion of the first robot arm and detachably fastened to the docking portion in a state of being aligned with respect to the fastening device, and a 3D vision camera configured to collect images of the gas container, the fastening device, and the docking module. A position of the fastening device may be adjusted in response to an operation of the mobile robot device, in a state in which the docking module is fastened to the docking portion.

The fastening device may further include an end cap detacher configured to detach the end cap from the valve of the gas container or mount the end cap on the valve of the container. The end cap detacher may be rotatable about a first rotation axis, and the valve connector may be rotatable about a second rotation axis.

The first rotation axis may coincide with a central axis of the valve of the gas container in a state in which the fastening device is aligned in a first state with respect to the valve of the gas container. The second rotation axis may coincide with the central axis of the valve of the gas container in a state in which the fastening device is aligned in a second state with respect to the valve of the gas container.

The first rotation axis and the second rotation axis may be parallel to each other.

The first rotation axis and the second rotation axis may be the same.

The docking module may include a power motor configured to supply power in a state in which the docking module is fastened to the fastening device. The docking portion may include a power transmitter into which a rotation shaft of the power motor is inserted, the power transmitter configured to transmit power from the power motor to the end cap detacher and the valve connector.

The gas supply system may further include a controller configured to control an operation of the mobile robot device based on the images collected by the 3D vision camera. The controller may be configured to determine an alignment position of the docking module according to a set algorithm, and control a first robot arm so that the docking module is positioned in the determined alignment position. The alignment position may be one of a first alignment position at which the docking module is aligned to be fastened to the docking portion of the fastening device, a second alignment position of the docking module at which the fastening device is in a first state with respect to the valve of the gas container, and a third position of the docking module at which the fastening device is in a second state with respect to the valve of the gas container.

The set algorithm may be configured to generate in real time a 3D model of the gas supply system in a virtual space based on the images collected through the 3D vision camera, determine an image similarity by comparing the generated 3D model with a set reference model, and determine a predicted position of the docking module at which the image similarity is greater than or equal to a set value to be the alignment position.

According to an aspect, there is provided an automated gas supply method performed through a gas supply system. The gas supply system may include a fastening device configured to detach an end cap from a valve of a gas container or fasten a valve connector to the valve of the gas container, and a mobile robot device including a docking module detachably fastened to the fastening device, and a first robot arm configured to move the docking module. The automated gas supply method may include determining whether the gas container is safely placed at a gas supply position, aligning the docking module by generating a 3D model in a virtual space according to relative positions of the gas container, the fastening device, and the docking module, fastening the docking module to the fastening device based on the generated 3D model, and moving the docking module so that the fastening device is aligned with the valve of the gas container, after the docking module is fastened to the fastening device.

The aligning of the docking module may include collecting a 3D image through a 3D vision camera, generating the 3D model based on the collected 3D image, determining an image similarity by comparing the 3D model with a set reference model, and determining a predicted position of the docking module at which the image similarity is greater than or equal to a set value, if the image similarity is less than the set value.

Additional aspects of embodiments will be set forth in part in the description which follows and, in part, will be apparent from the description, or may be learned by practice of the disclosure.

According to an embodiment, a gas supply system may reduce or minimize the space in which a gas supply device is installed by providing power to the gas supply device through a mobile robot that is optionally connected to the gas supply device.

According to an embodiment, a gas supply system may simplify the structure of a gas supply device by detecting the alignment state of the gas supply device with respect to a gas container through a mobile robot positioned outside a cabinet where the gas container is safely placed.

According to an embodiment, a gas supply system may detect the alignment state of a gas supply device with respect to a gas container through 3D mapping using a 3D camera, thereby preventing mounting in a misaligned state to minimize or reduce damage and breakage of the device.

The effects of the gas supply system and/or the gas supply method according to embodiments are not limited to the above-mentioned effects, and other unmentioned effects may be clearly understood from the following description by one of ordinary skill in the art.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
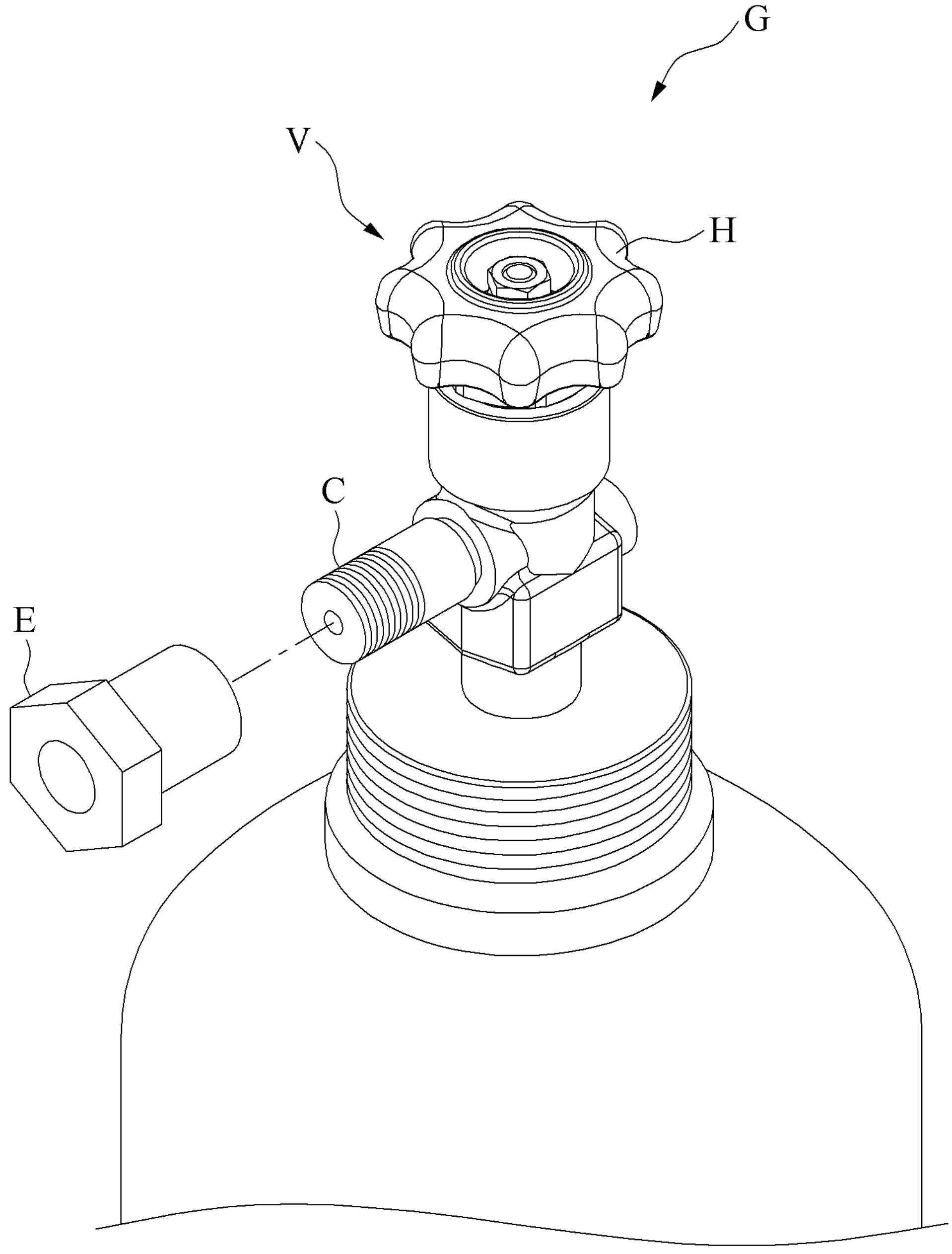
FIG. 1 is a perspective view of a portion of a gas container according to an embodiment.

Hereinafter, embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not intended to be limiting. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the embodiments belong. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

When describing the embodiments with reference to the accompanying drawings, like reference numerals refer to like components and a repeated description related thereto will be omitted. In the description of embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one component from another component, and the nature, the sequences, or the orders of the components are not limited by the terms. It should be noted that if one component is described as being "connected," "coupled" or "joined" to another component, the former may be directly "connected," "coupled," and "joined" to the latter or "connected", "coupled", and "joined" to the latter via another component.

The same name may be used to describe an element included in the embodiments described above and an element having a common function. Unless otherwise mentioned, the descriptions of the examples may be applicable to the following examples and thus, duplicated descriptions will be omitted for conciseness.

FIG. 1 is a perspective view of a portion of a gas container according to an embodiment.

A gas container G used in an automated gas supply system 1 according to an embodiment will be described with reference to FIG. 1. In an embodiment, the gas container G may store a process gas therein. In an embodiment, a valve assembly V may be provided in the upper portion of the gas container G to discharge the gas stored therein or to inject a gas from the outside. In an embodiment, the valve assembly V may optionally regulate the gas flow, while providing a flow path to discharge the gas stored in the gas container G to the outside. In an embodiment, a valve C with an open outlet to discharge a gas to the outside may be formed to protrude from a side surface of the valve assembly V. In an embodiment, the valve C may be connected to a valve connector 112 of a fastening device 110 described below (e.g., the fastening device 110 of FIG. 2). In an embodiment, a valve C shutter (not shown) may be provided in the valve assembly V to regulate gas flow through the valve C. The valve C shutter may regulate the gas flow through the valve C by rotating a valve handle H positioned in the upper portion of the valve assembly V.

In an embodiment, an end cap E may be mounted on the outer circumferential surface of the valve C of the gas container G to prevent gas leakage by covering the outlet. The end cap E may be mounted on the valve C to enclose the outer circumferential surface of the valve C. In an embodiment, the end cap may be screwed onto the valve C along the outer circumferential surface of the valve C to be mounted on the valve C or removed from the valve C. In an embodiment, the end cap E may have a polygonal cross section, but the shape of the cross section of the end cap E is not limited thereto.

In an embodiment, for the gas supply system 1 to receive the gas from the gas container G, the end cap E mounted on the valve C needs to be detached and removed first. When a series of operations of receiving the gas from the gas container G is completed, the end cap E may be mounted again on the valve C of the gas container G to close the outlet.

In an embodiment, the gas container G may be fastened to the fastening device 110 of the gas supply system 1 while disposed at a set safe placing position. For example, the safe placing position may be in the internal space of a cabinet 100 described below. In an embodiment, since the gas container G generally has great weight, the fastening device 110 may be fastened to the gas container G in such a manner that the fastening device 110 is aligned with respect to the gas container G after the gas container G is disposed at the safe placing position. However, embodiments are not limited thereto.

Hereinafter, in describing the gas supply system 1, the gas supply system 1 will be described on the premise that the gas container G is disposed at the set safe placing position.

Figure 2:
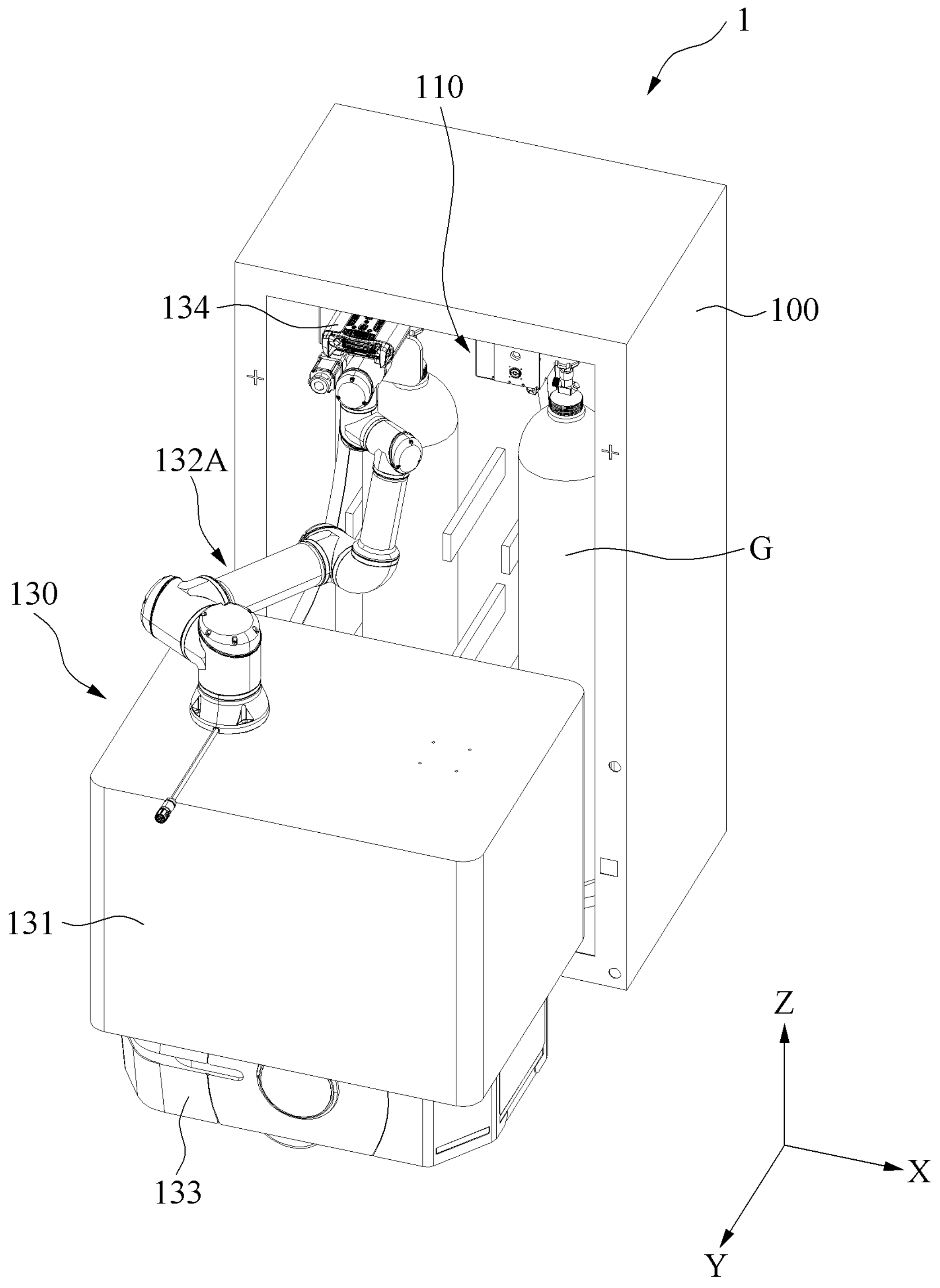
FIG. 2 is a perspective view of a gas supply system according to an embodiment.
Figure 3A:
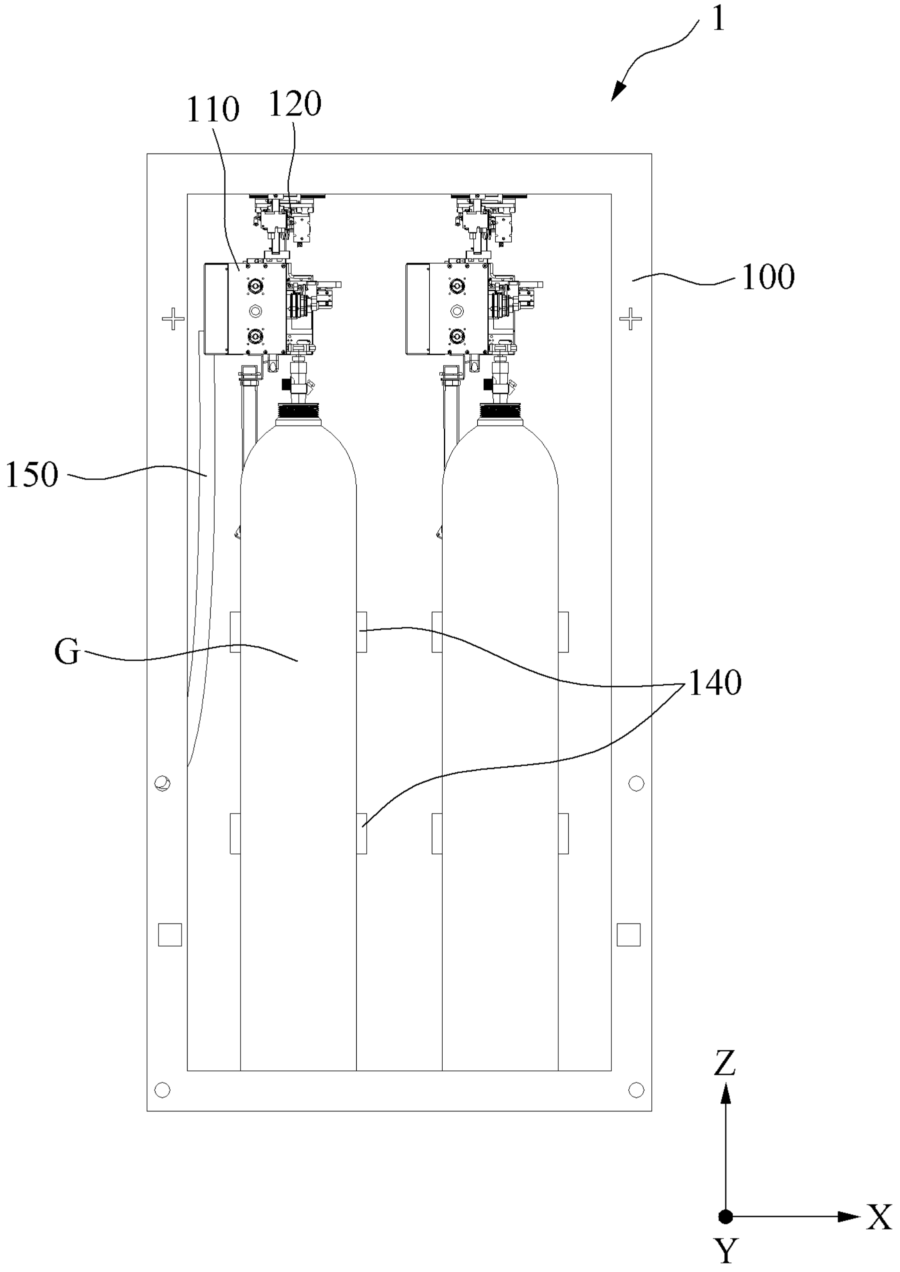
FIG. 3A is a front view illustrating a gas supply system according to an embodiment.
Figure 3B:
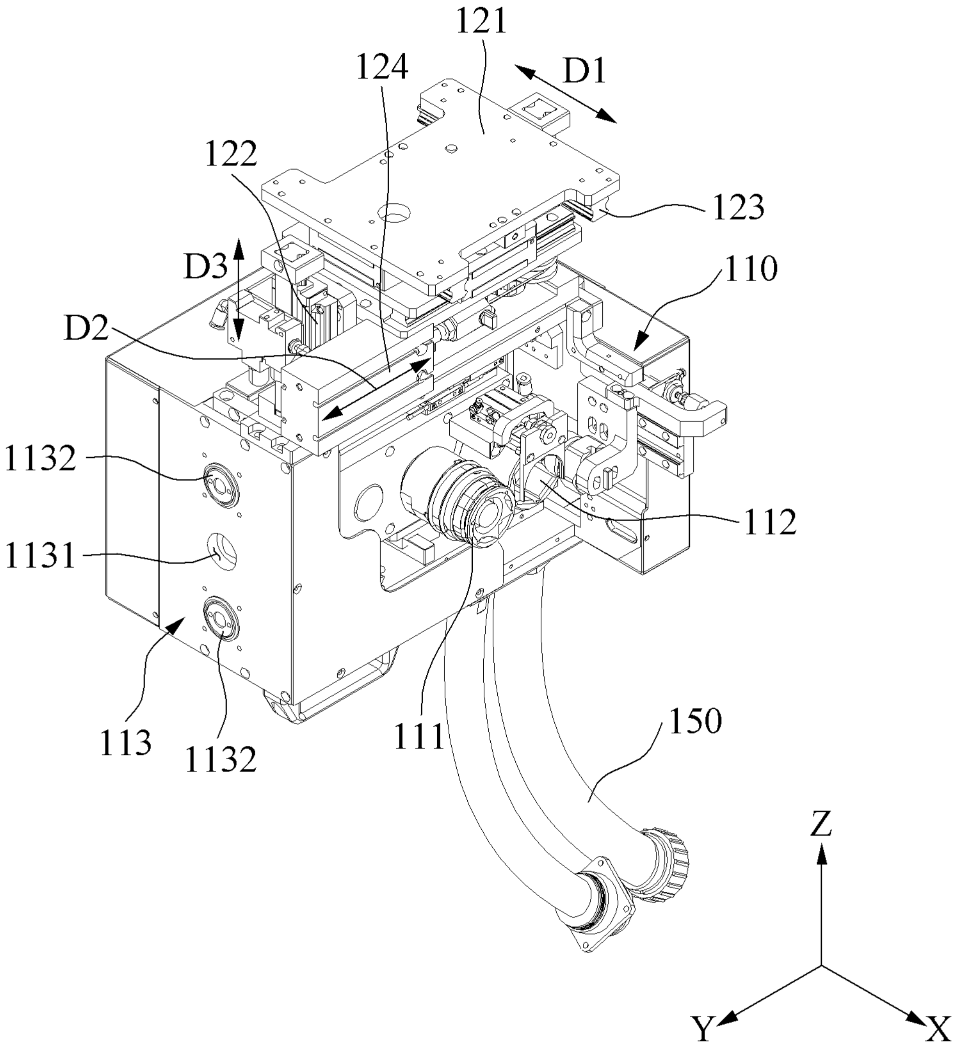
FIG. 3B is a perspective view illustrating a fastening device and a position adjustment module according to an embodiment.
Figure 3C:
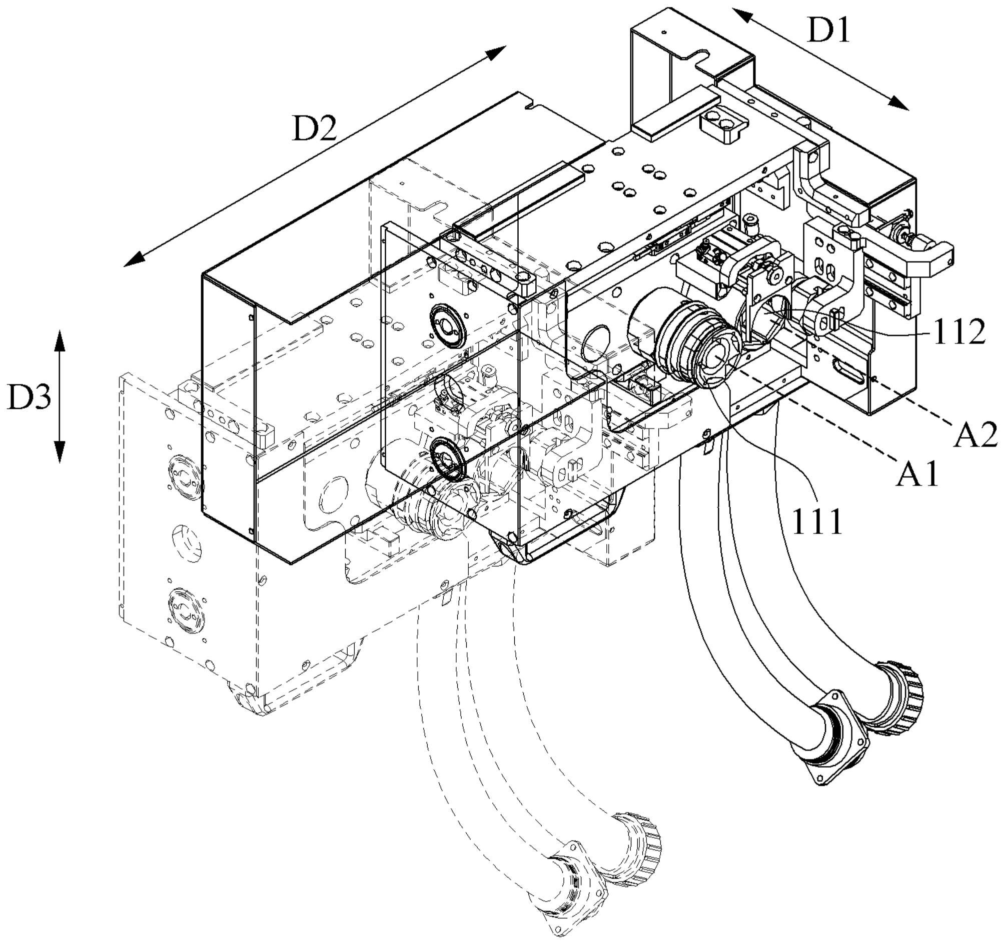
FIG. 3C is a view schematically illustrating a process of changing the position of a fastening device according to an embodiment.
Figure 4A:
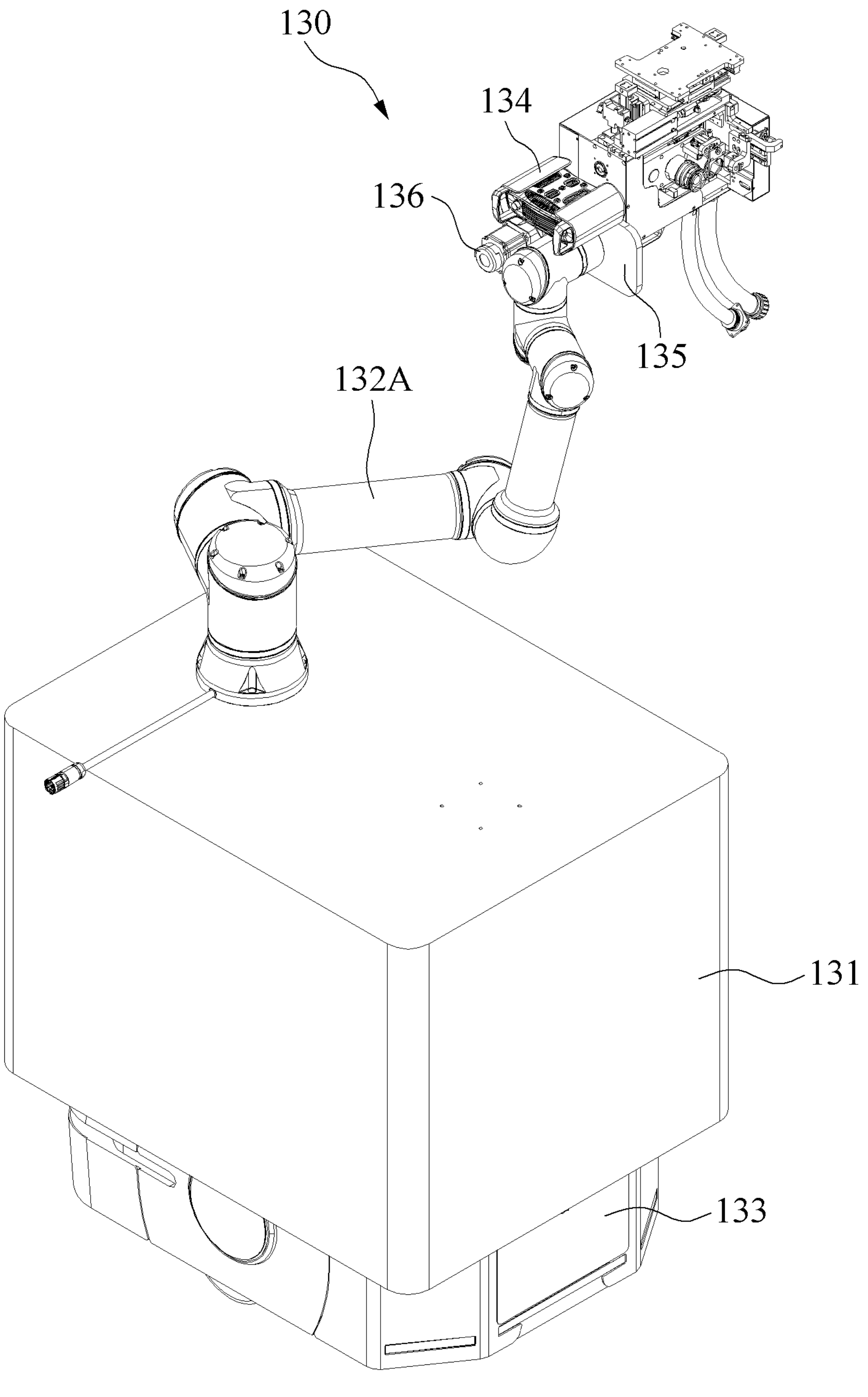
FIG. 4A is a perspective view of a mobile robot device according to an embodiment.
Figure 4B:
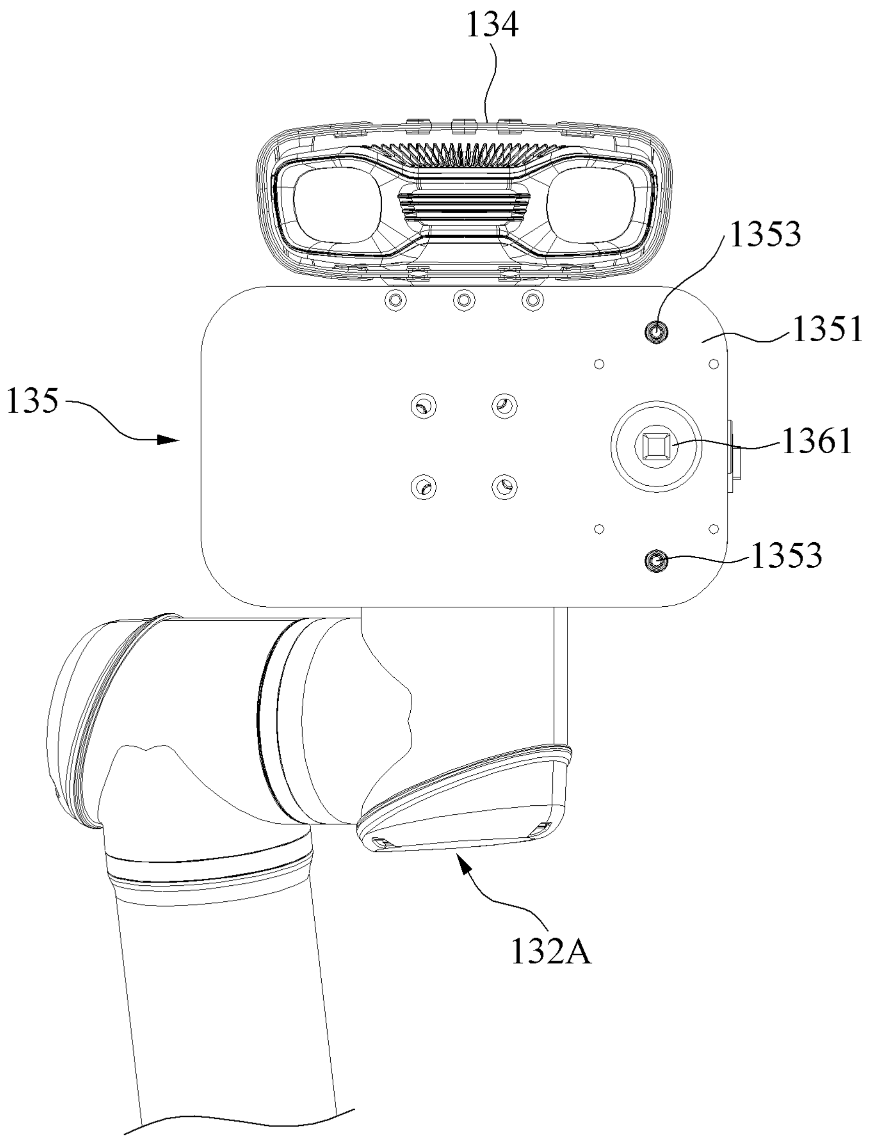
FIG. 4B is a plan view illustrating a docking module of a mobile robot device according to an embodiment.
Figure 5:
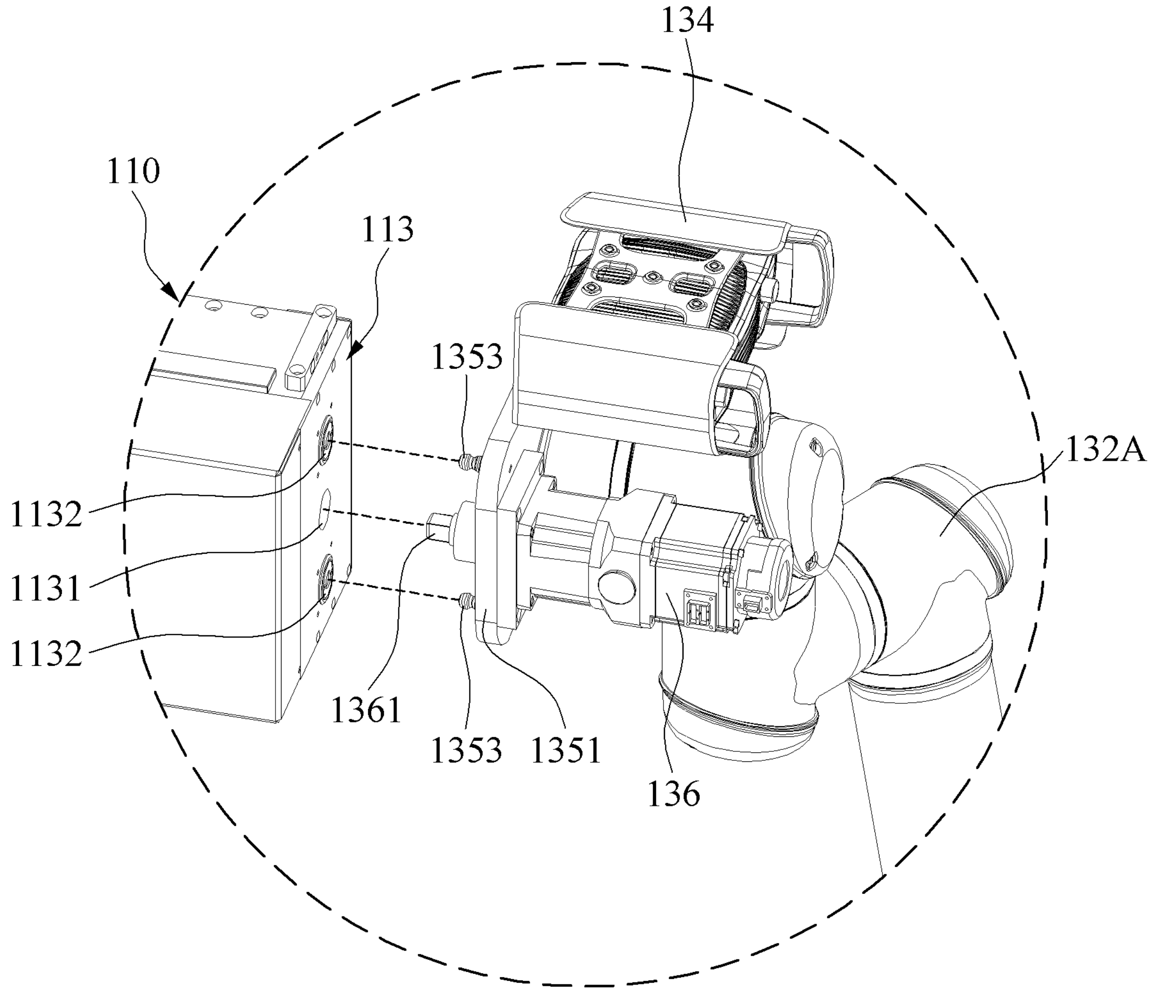
FIG. 5 is a view illustrating a process of connecting a docking module to a docking portion of a fastening device according to an embodiment.

FIG. 2 is a perspective view of a gas supply system according to an embodiment. FIG. 3A is a front view illustrating the gas supply system according to an embodiment. FIG. 3B is a perspective view illustrating a fastening device and a position adjustment module according to an embodiment. FIG. 3C is a view schematically illustrating a process of changing the position of the fastening device according to an embodiment. FIG. 4A is a perspective view of a mobile robot device according to an embodiment. FIG. 4B is a plan view illustrating a docking module of the mobile robot device according to an embodiment. FIG. 5 is a view illustrating a process of connecting the docking module to a docking portion of the fastening device according to an embodiment.

Referring to FIGS. 2 to 5, a gas supply system 1 according to an embodiment may be automatically connected to a gas container G disposed at a set position. In an embodiment, the gas supply system 1 may automatically detach or attach an end cap E mounted on a valve C of the gas container G. The gas supply system 1 may be fastened to the valve C of the gas container G to supply a gas inside the gas container G to a gas pipe 150.

In an embodiment, the gas supply system 1 may include a cabinet 100, a fastening device 110, a position adjustment module 120, and a mobile robot device 130 disposed outside the cabinet 100.

In an embodiment, the cabinet 100 may accommodate the gas container G therein. The cabinet 100 may form an internal space where the gas container G is disposed. The cabinet 100 may include a door portion (not shown) to open and close the internal space so that the gas container G may enter the internal space or the gas container G may leave the internal space after use. In the drawings, it is shown that the internal space of the cabinet 100 is open (e.g., in the +Y direction of the cabinet 100 of FIG. 2), but this is for ease of description. The internal space of the cabinet 100 may be opened and closed by the door portion that is not shown. The door portion may seal the internal space of the cabinet 100 to reduce or prevent the gas stored in the gas container G from leaking out of the cabinet 100, during the process of supplying a gas from the gas container G disposed inside the cabinet 100 to the gas pipe 150.

In an embodiment, one or more gas containers G may be disposed in the cabinet 100. For example, as shown in FIG. 2, two gas containers G and two fastening devices 110 respectively fastened to the two gas containers G may be disposed in the cabinet 100. However, this is an example, and the number of gas containers G and the number of fastening devices 110 corresponding thereto are not limited and may be changed depending on the design. Hereinafter, the configuration of the gas supply system 1 will be described based on one gas container G and one fastening device 110 corresponding thereto disposed in the cabinet 100.

In an embodiment, a support (not shown) supporting the gas container G may be disposed on the floor surface of the internal space of the cabinet 100. In an embodiment, the support may rotate about an axis perpendicular to the ground while supporting the gas container G at its lower end. By rotating the gas container G through the support, the position of the valve C of the gas container G in the cabinet 100 may be changed.

In an embodiment, a support clamp 140 may be disposed in the cabinet 100 to support the outer circumferential surface of the gas container G that is safely placed. The support clamp 140 may operate to optionally grip the outer circumferential surface of the gas container G or move away from the outer circumferential surface of the gas container G.

In an embodiment, the position adjustment module 120 may movably connect the fastening device 110 to the cabinet 100. In an embodiment, the position adjustment module 120 may include a fixed plate 121, a first moving member 123, a second moving member 124, and a third moving member 122.

In an embodiment, the fixed plate 121 may be fixed to the internal space of the cabinet 100. For example, the fixed plate 121 may be fixed to the top surface of the internal space.

The first moving member 123 may connect the fixed plate 121 and the fastening device 110, and move with respect to the fixed plate 121 in a first direction D1 parallel to the ground. The second moving member 124 may connect the fixed plate 121 and the fastening device 110, and move with respect to the fixed plate 121 in a second direction D2 parallel to the ground and perpendicular to the first direction D1. The third moving member 122 may connect the fixed plate 121 and the fastening device 110, and move with respect to the fixed plate 121 in a third direction D3 perpendicular to the ground, for example, the third direction perpendicular to the first direction D1 and the second direction D2. In an embodiment, the first moving member 123, the second moving member 124, and the third moving member 122 may be sequentially connected from the fixed plate 121 along the fastening device 110, and the relative connection order of the moving members is not limited thereto. For example, as shown in FIG. 3B, the first moving member 123 may be connected to the fixed plate 121 to move in the first direction D1, the third moving member 122 may be connected to the first moving member 123 to move in the third direction D3, and the second moving member 124 may be connected to the third moving member 122 to move in the second direction D2. However, the connection order thereof is not limited thereto.

In an embodiment, the position adjustment module 120 may adjust the three-dimensional (3D) coordinates of the fastening device 110 with respect to the fixed plate 121 through the movement of each moving member 123, 124, or 122. Accordingly, when a mobile robot device 130 described below applies an external force to move the fastening device 110 in a state in which the mobile robot device 130 is connected to the fastening device 110, the position adjustment module 120 may operate in response to the external force applied to the fastening device 110 and adjust the relative position of the fastening device 110 with respect to the fixed plate 121, thereby changing the position of the fastening device 110 in the internal space of the cabinet 100.

Through this operation, the fastening device 110 may be aligned with respect to the valve C of the gas container G.

In an embodiment, the position adjustment module 120 may rotate the fastening device 110 in the internal space of the cabinet 100. For example, the position adjustment module 120 may include a structure for implementing a three-degree-of-freedom rotational motion of the fastening device 110. For example, the position adjustment module 120 may include a plurality of rotating members (not shown) that connect the fixed plate 121 and the fastening device 110 and enable the fastening device 110 to move in three degrees of freedom of yaw, pitch, and roll with respect to the fixed plate 121.

According to this structure, the fastening device 110 may perform translational motions in three degrees of freedom and rotational motions in three degrees of freedom with respect to the fixed plate 121 by means of the position adjustment module 120, so that the 3D position and change thereof may be changed in the cabinet 100.

In an embodiment, the fastening device 110 may be installed movably in the internal space of the cabinet 100. As mentioned above, the fastening device 110 may be connected to the inside of the cabinet 100 through the position adjustment module 120, and the position and angle thereof in the cabinet 100 may be adjusted through the operation of the position adjustment module 120. For example, the fastening device 110 may be positioned in the upper portion of the internal space of the cabinet 100.

In an embodiment, the fastening device 110 may operate to detach an end cap (e.g., the end cap E of FIG. 1) from the valve C of the gas container G or to be fastened to the valve C of the gas container G to receive a gas. The fastening device 110 may be configured to detach/mount the end cap E in a state of being relatively aligned with respect to the valve C of the gas container G or to be fastened to the valve C.

In an embodiment, the fastening device 110 may include an end cap detacher 111 for removing or mounting the end cap from or on the valve C of the gas container G, a valve connector 112 detachably fastened to the valve C of the gas container G, and a docking portion 113 connected to the mobile robot device 130 to receive power.

In an embodiment, the end cap detacher 111 may detach and remove the end cap E mounted on the valve C, or mount the end cap again on the valve C of the gas container G after use. In an embodiment, an insertion recess into which at least a portion of the end cap is inserted may be formed in the end cap detacher 111. The insertion recess may be formed in a shape corresponding to the cross section of the end cap. For example, when the end cap is formed to have a regular hexagonal cross section as shown in FIG. 1, the insertion recess formed in the end cap detacher 111 may be formed to have a regular hexagonal cross section corresponding to the cross section of the end cap so that the end cap may be inserted thereinto. In an embodiment, the end cap detacher 111 may rotate about a first rotation axis A1. The first rotation axis A1 may be disposed to penetrate through the center of the insertion recess. In an embodiment, in a state in which the fastening device 110 is aligned with respect to the valve C at a first position, the first rotation axis A1 of the end cap detacher 111 may coincide with the central axis of the end cap.

In an embodiment, since the end cap is detached from and fastened to the valve C in a screwing manner, the end cap detacher 111 may unscrew the end cap from the valve C or screw the end cap onto the valve C by rotating about the first rotation axis while gripping the outer surface of the end cap through the insertion recess.

In an embodiment, in a state in which the fastening device 110 is aligned in a first state with respect to the valve C of the gas container G, the end cap detacher 111 may be placed in a state to detach the end cap from the valve C or mount the end cap thereon. For example, in a state in which the fastening device 110 is aligned in the first state with respect to the valve C of the gas container G, the end cap detacher 111 may be disposed to face the valve C in a state in which the first rotation axis A1 coincides with the central axis of the valve C, that is, the rotation center of the end cap mounted on the valve C.

In an embodiment, for the end cap to be inserted into the insertion recess of the end cap detacher 111, the rotation angle of the end cap needs to be adjusted to match the shape of the insertion recess with the shape of the end cap in a state in which the first rotation axis A1 coincides with the central axis of the valve C. In an embodiment, the end cap detacher 111 may rotate about the first rotation axis A1 through the power received from the mobile robot device 130 described below, thereby adjusting the relative rotation angle with respect to the end cap. For example, the first rotation axis A1 of the end cap detacher 111 and the central axis of the end cap may coincide through the position adjustment of the fastening device 110, and the rotation angle of the end cap detacher 111 may be performed by a rotational motion of the end cap detacher 111 on the first rotation axis A1.

In an embodiment, when the axial coincidence and rotation angle adjustment of the end cap detacher 111 with respect to the end cap is completed, the end cap detacher 111 may advance toward the end cap along the first rotation axis A1 and accommodate the end cap in the insertion recess. With the end cap inserted into the insertion recess, the end cap detacher 111 may translate along the first rotation axis A1 while rotating about the first rotation axis A1, thereby removing the end cap from the valve C. The end cap may be mounted again on the valve C by performing the end cap detaching operation reversely.

In an embodiment, a valve connector 112 may be connected to the gas pipe 150 and connected to the valve C of the gas container G with the end cap removed, to receive a gas from the gas container G. In an embodiment, the valve connector 112 may operate to be fastened to the valve C, in a state in which the fastening device 110 is aligned in a second state with respect to the valve C of the gas container G.

In an embodiment, the valve connector 112 may rotate along a second rotational axis A2. In an embodiment, the valve connector 112 may translate forward and backward along the second rotational axis A2. In an embodiment, the second rotation axis A2 of the valve connector 112 may substantially coincide with the central axis of the valve C in a state in which the fastening device 110 is aligned in the second state with respect to the valve C of the gas container G. In this case, the valve connector 112 may be fastened to the valve C by advancing toward the valve C along the second rotation axis A2. In an embodiment, the rotational and advancing motion of the valve connector 112 may be performed by the power received from the mobile robot device 130.

In an embodiment, the second rotation axis A2 of the valve connector 112 and the first rotation axis A1 of the end cap detacher 111 may be disposed in parallel substantially on the same plane. According to this structure, when the fastening device 110 translates in one direction (e.g., the second direction D2 of FIG. 3C) in a state in which the fastening device 110 is aligned in the first state with respect to the valve C of the gas container G, for example, in a state in which the first rotation axis A1 of the end cap detacher 111 coincides with the central axis of the end cap, the fastening device 110 may be aligned in the second state with respect to the valve C of the gas container G. In this case, the valve connector 112 and the end cap detacher 111 may be disposed side by side.

In another example not shown in the drawings, the valve connector 112 and the end cap detacher 111 may be formed so that the second rotation axis A2 and the first rotation axis A1 coincide. For example, the valve connector 112 may be positioned inside the insertion recess of the end cap detacher 111 and formed to rotate about the same rotation axis as the end cap detacher 111. In this case, as the fastening device 110 translates along the first rotation axis A1 in a state in which the fastening device 110 is aligned in the first state with respect to the valve C of the gas container G, for example, in a state in which the first rotation axis A1 of the end cap detacher 111 coincides with the central axis of the end cap, the fastening device 110 may be aligned in the second state with respect to the valve C of the gas container G.

Meanwhile, the position and angle of the fastening device 110 in the first state of being aligned to detach/mount the end cap from/on the valve C and the position and angle of the fastening device 110 in the second state of being aligned to be fastened to the valve C may vary relatively according to the position and angle of the valve C of the gas container C disposed in the cabinet 100.

In an embodiment, the docking portion 113 may be disposed to be exposed on the outer surface of the fastening device 110. For example, the docking portion 113 may be positioned on a side of the fastening device 110 facing the open portion of the cabinet 100 (e.g., a side of the fastening device 110 facing the +Y axis of FIG. 3A). In an embodiment, the mobile robot device 130 may be detachably connected to the docking portion 113. For example, a docking module 135 of the mobile robot device 130 described later may be connected to the docking portion 113.

In an embodiment, in a state in which the mobile robot device 130 is connected to the docking portion 113, the position of the fastening device 110 in the internal space of the cabinet 100 may be changed by the mobile robot device 130. In an embodiment, in a state in which the mobile robot device 130 is connected to the docking portion 113, the fastening device 110 may receive power supplied by the mobile robot device 130 through the docking portion 113 and operate the end cap detacher 111 and the valve connector 112.

In an embodiment, the docking portion 113 may include a docking clamp 1132 to which the docking module 135 of the mobile robot device 130 is fastened, and a power transmitter 1131 to which a rotation shaft 1361 of a power motor of the mobile robot device 130 is connected. In an embodiment, the docking clamp 1132 may hold the fastening state of the docking module 135 to the docking portion 113 or release the fastening state so that the docking module 135 is detached therefrom. The docking portion 113 will be described further below.

In an embodiment, the mobile robot device 130 may move outside the cabinet 100. The mobile robot device 130 may be detachably connected to the fastening device 110, and may move the fastening device 110 or supply power to the fastening device 110 in a state of being connected to the fastening device 110. In an embodiment, the mobile robot device 130 may include a body 131, a traveling portion 133, a first robot arm 132A, the docking module 135, a 3D vision camera 134, and a controller.

In an embodiment, the body 131 may form the body of the mobile robot device 130. The components (e.g., an actuator, a controller, a communication device, etc.) for the operation of the mobile robot device 130 may be disposed inside the body 131. The body 131 may move along the ground.

In an embodiment, the traveling portion 133 may be disposed at the lower end of the body 131. The traveling portion 133 may move the body 131 along the ground. The traveling portion 133 may include, for example, a guide member that moves along a guide rail installed on the ground, or may include a rolling member that moves on the ground. In an embodiment, the traveling portion 133 may operate to move the mobile robot device 130 according to an instruction from the controller.

In an embodiment, the first robot arm 132A may be installed on the body 131. In an embodiment, the first robot arm 132A may be disposed on the upper portion of the body 131. In an embodiment, the first robot arm 132A may be configured as a multi-joint arm that implements movement in multiple degrees of freedom, for example, movement in six degrees of freedom. For example, the first robot arm 132A may implement 3D movement with respect to the ground (e.g., translational movement in the X-, Y-, and Z-axial directions) and angular movement in three directions (e.g., movement of roll, yaw, and pitch) through the operation of the multi-joint arm.

In an embodiment, the docking module 135 may be disposed at an end portion of the first robot arm 132A. In an embodiment, the docking module 135 may be detachably fastened to the fastening device 110. The docking module 135 may be fastened to the docking portion 113 of the fastening device 110 through the operation of the first robot arm 132A. The docking module 135 may be fastened to the docking portion 113 to move the fastening device 110 according to the operation of the first robot arm 132A, and may provide power to the fastening device 110 in a state of being fastened to the fastening device 110. In an embodiment, the docking module 135 may include a docking plate 1351, a docking member 1353, and a power motor 136.

In an embodiment, the docking plate 1351 may be disposed at an end portion of the first robot arm 132A. In an embodiment, the docking plate 1351 may include a docking surface (e.g., the surface of the docking plate 1351 shown in FIG. 4B) that faces a surface (e.g., a surface facing the +Y axis of FIG. 3B) of the docking portion 113.

In an embodiment, the docking member 1353 may be disposed on the docking surface of the docking plate 1351. For example, the docking member 1353 may be formed to protrude from the docking surface. In an embodiment, the docking member 1353 may be optionally fastened to the docking clamp 1132 of the docking portion 113. For example, the docking member 1353 may be inserted and fastened to the docking clamp 1132. In an embodiment, when a plurality of docking clamps 1132 are disposed on the surface of the docking portion 113, a plurality of docking members 1353 may be formed on the docking surface of the docking plate 1351 at positions respectively corresponding to the plurality of docking clamps 1132.

In an embodiment, the power motor 136 may be installed at an end portion of the first robot arm 132A. The rotation shaft 1361 of the power motor 136 may penetrate through the docking plate 1351 and protrude from the docking surface of the docking plate 1351. In an embodiment, in a state in which the docking module 135 is fastened to the docking portion 113, for example, in a state in which the docking member 1353 is fastened to the docking clamp 1132, the rotation shaft 1361 of the power motor 136 may be inserted into the power transmitter 1131 formed in the docking portion 113. The power motor 136 may transmit power to the fastening device 110 through the power transmitter 1131. The power transmitted from the power motor 136 to the fastening device 110 may be transmitted to the end cap detacher 111 and the valve connector 112 of the fastening device 110.

In an embodiment, for the docking module 135 to be fastened to the docking portion 113 of the fastening device 110, the docking module 135 needs to be aligned in a fastening state to be fastenable to the docking portion 113. In an embodiment, as shown in FIG. 5, in the fastening state in which the docking module 135 is aligned to be fastenable to the docking portion 113, the docking member 1353 of the docking module 135 and the rotation shaft 1361 of the power motor 136 may be disposed at positions corresponding to the docking clamp 1132 and the power transmitter 1131 of the docking portion 113, respectively. The fastening state in which the docking module 135 is fastenable to the docking portion 113 of the fastening device 110 may relatively vary depending on the position and angle of the fastening device 110 in the cabinet 100.

In an embodiment, in a state in which the docking module 135 is fastened to the docking portion 113 of the fastening device 110, the docking module 135 and the fastening device 110 may move as an integral body, so that the position of the fastening device 110 in the internal space of the cabinet 100 may be adjusted by the first robot arm 132A. For example, the relative position of the fastening device 110 with respect to the valve C of the gas container G may be adjusted by the first robot arm 132A.

In an embodiment, the 3D vision camera 134 may collect images of the gas supply system 1. For example, the 3D vision camera 134 may collect 3D images of the gas supply system 1 including the docking module 135, the fastening device 110, and the valve C of the gas container G. In an embodiment, the 3D vision camera 134 may be disposed at an end portion of the first robot arm 132A, for example, on an upper portion of the docking plate 1351. The 3D vision camera 134 may be disposed on the first robot arm 132A to collect front view images of the docking module 135 facing the docking portion 113, for example, images in the direction of the docking surface of the docking plate 1351. In an embodiment, the image collection position of the 3D vision camera 134 is not limited to the example described above, and may be set to collect images in various directions depending on the set conditions. For example, the 3D vision camera 134 may be disposed on the first robot arm 132A to collect down view images of the docking module 135, for example, images in the direction of the ground of the docking plate 1351.

In an embodiment, the controller may control the operation of the mobile robot device 130. In an embodiment, the controller may move the mobile robot device 130 toward the cabinet 100 or away from the cabinet 100.

In an embodiment, during the process of connecting the mobile robot device 130 to the fastening device 110, the controller may operate the first robot arm 132A so that the docking module 135 may be fastened to the docking portion 113 of the fastening device 110, based on the 3D images collected by the 3D vision camera 134.

In an embodiment, in a state in which the mobile robot device 130 is connected to the fastening device 110, the controller may align the fastening device 110 with respect to the valve C of the gas container G by operating the first robot arm 132A based on the images collected by the 3D vision camera 134. For example, the controller may adjust the position and angle of the fastening device 110 by moving and adjusting the docking module 135, so that the fastening device 110 may be aligned in a first state in which the fastening device 110 can detach/mount the end cap from/on the valve C or in a second state in which the fastening device 110 is fastenable to the valve C.

In an embodiment, the controller may determine one or more alignment positions of the docking module 135 according to a set algorithm, and control the operation of the first robot arm 132A so that the docking module 135 is positioned at the determined alignment position. An alignment position of the docking module 135 may include 3D coordinates and a 3D rotation angle thereof in the cabinet 100.

In an embodiment, an alignment position of the docking module 135 may be determined according to the operational purpose according to the process sequence of the gas supply system 1. In an embodiment, in the process of fastening the mobile robot device 130 to the fastening device 110, the alignment position of the docking module 135 may be a first alignment position at which the docking module 135 is in the fastening state of being relatively aligned to be fastened to the fastening device 110, that is, at which the docking module 135 is in the fastening state of being aligned to be fastened in response to the position and angle of the docking portion 113.

In an embodiment, in a state in which the mobile robot device 130 is fastened to the fastening device 110, that is, in a state in which the docking module 135 is fastened to the docking portion 113, the alignment position of the docking module 135 may be a second alignment position of the docking module 135 at which the fastening device 110 is in the first state with respect to the valve C of the gas container G. For example, the second alignment position of the docking module 135 may indicate the position and angle of the docking module 135 at which the end cap detacher 111 of the fastening device 110 causes the first rotation axis A1 to coincide with the central axis of the valve C in response to the position and angle of the valve of the gas container G.

In an embodiment, in a state in which the mobile robot device 130 is fastened to the fastening device 110, that is, in a state in which the docking module 135 is fastened to the docking portion 113, the alignment position of the docking module 135 may be a third alignment position of the docking module 135 at which the fastening device 110 is in the second state with respect to the valve C of the gas container G. For example, the third alignment position of the docking module 135 may indicate the position and angle of the docking module 135 at which the second rotation axis A2 of the valve connector 112 of the fastening device 110 coincides with the central axis of the valve C in response to the position and angle of the valve of the gas container G.

In an embodiment, the controller may determine the alignment position of the docking module 135 according to a set algorithm. For example, the set algorithm may be set to generate a 3D model of a virtual space, for example, a 3D model of the docking module 135, the gas container G, and the fastening device 110, in real time through images acquired by the 3D vision camera 134. In an embodiment, the 3D model may change based on real-time images acquired by the 3D vision camera 134. In an embodiment, the set algorithm may determine an image similarity by comparing a generated 3D image with a set reference model. For example, the set reference model may be a 3D model in a fastening state in which the docking module 135 is aligned to be fastenable to the docking portion 113. For example, the set reference model may be a 3D model in a state in which the fastening device 110 connected to the docking module 135 is aligned in the first state with respect to the valve C of the gas container G. For example, the set reference model may be a 3D model in a state in which the fastening device 110 connected to the docking module 135 is aligned in the second state with respect to the valve C of the gas container G. In an embodiment, the set algorithm may be set to determine the need for position adjustment of the docking module 135 by determining the image similarity between the generated 3D image and the set reference model.

In an embodiment, if the image similarity is greater than or equal to a set value, the set algorithm may be set to generate an instruction to perform an operation determined according to the reference model. For example, if the reference model is a 3D model in a fastening state in which the docking module 135 is aligned to be fastenable to the docking portion 113, the set algorithm may be set to generate an instruction to perform an operation of fastening the docking module 135 to the docking portion 113 when the image similarity is greater than or equal to the set value. For example, if the reference model is a 3D model in a state in which the fastening device 110 is aligned in the first state with respect to the valve C, the set algorithm may be set to generate an instruction to operate the end cap detacher 111 to remove the end cap from the valve C when the image similarity is greater than or equal to the set value. For example, if the set reference model is a 3D model in a state in which the fastening device 110 is aligned in the second state with respect to the valve C of the gas container G, the set algorithm may be set to generate an instruction to operate the valve connector 112 to be fastened to the valve C when the image similarity is greater than or equal to the set value.

In an embodiment, if the image similarity is greater than or equal to the set value, the set algorithm may be set to predict a position of the docking module 135 at which the 3D model has an image similarity to the reference model greater than or equal to the set value and determine the predicted position to be the alignment position of the docking module 135.

In an embodiment, when the set algorithm determines the alignment position of the docking module 135, the controller may adjust the 3D coordinates and the 3D rotation angle of the docking module 135 by controlling the first robot arm 132A so that the docking module 135 may be positioned at the determined alignment position.

In an embodiment, the controller may align the fastening device 110 connected to the docking module 135 by moving the docking module 135 through the operation of the first robot arm 132A, in a state in which the docking module 135 is fastened to the docking portion 113. In an embodiment, the controller may control the operation of the first robot arm 132A so that the fastening device 110 is in the first state with respect to the valve C of the gas container G, based on the images collected by the 3D vision camera 134. In an embodiment, the controller may control the power motor 136 to transmit power to the power transmitter 1131 when the fastening device 110 is aligned in the first state with respect to the valve C of the gas container G, thereby operating the end cap detacher 111. In an embodiment, the controller may control the operation of the first robot arm 132A so that the fastening device 110 is in the second state with respect to the valve C of the gas container G, based on the images collected by the 3D vision camera 134. In an embodiment, the controller may control the power motor 136 to transmit power to the power transmitter 1131 when the fastening device 110 is aligned in the second state with respect to the valve C of the gas container G, thereby operating the valve connector 112.

In an embodiment, the gas supply system 1 may transmit power from the outside of the fastening device 110 through the mobile robot device 130 and align the fastening device 110, thereby eliminating a separate component (e.g., an actuator, etc.) for operating the fastening device 110. Accordingly, the structure of the fastening device 110 may be simplified, improving the maintenance convenience. In addition, the gas supply system 1 may reduce the space occupied by the fastening device 110 in the cabinet 100, thereby reducing spatial constraints for installation of the gas supply system 1.

Figure 6:
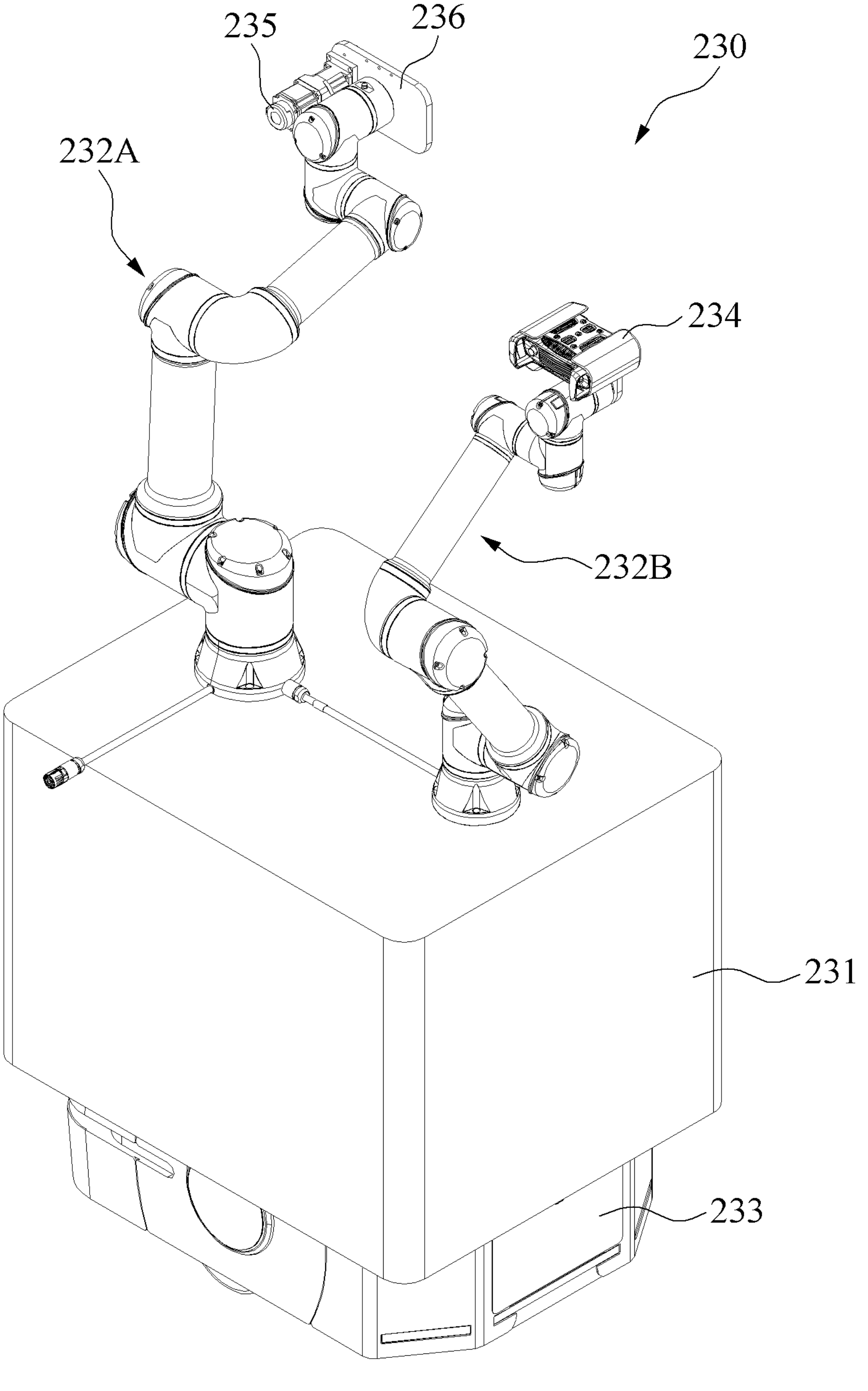
FIG. 6 is a perspective view of a mobile robot device according to an embodiment.

FIG. 6 is a perspective view of a mobile robot device according to an embodiment.

Referring to FIG. 6, a mobile robot device 230 according to an embodiment may be connected to a fastening device (e.g., the fastening device 110 of FIG. 2) to supply power and adjust the position of the fastening device 110.

In an embodiment, the mobile robot device 230 may include a body 231, a traveling portion 233, a first robot arm 232A, a second robot arm 232B, a docking module 236 including a power motor 235, a 3D vision camera 234, and a controller.

In an embodiment, the body 231 may form the body of the mobile robot device 230. In an embodiment, the traveling portion 233 may be disposed at the lower end of the body 231 to move the body 231 along the ground. In an embodiment, the first robot arm 232A may be disposed on the upper portion of the body 231. In an embodiment, the first robot arm 232A may be configured as a multi-joint arm that implements movement in multiple degrees of freedom, for example, movement in six degrees of freedom.

In an embodiment, the docking module 236 may be disposed at an end portion of the first robot arm 232A. In an embodiment, the docking module 236 may be connected to a docking portion of the fastening device through the operation of the first robot arm 232A. The docking module 236 may be connected to the docking portion to provide power to operate the fastening device.

In an embodiment, the second robot arm 232B may be disposed on the upper portion of the body 231. In an embodiment, the second robot arm 232B may be configured as a multi-joint arm that implements movement in multiple degrees of freedom, for example, movement in six degrees of freedom.

In an embodiment, the 3D vision camera 234 may be disposed at an end portion of the second robot arm 232B to collect 3D images including the docking module 236, the fastening device, and a valve of a gas container.

By this structure, the 3D vision camera 234 may collect images of each component of the gas supply system at an independent position, regardless of the operation of the first robot arm 232A, so that 3D images in virtual space may be generated more accurately.

Meanwhile, although FIG. 6 shows the 3D vision camera 234 disposed only at the end portion of the second robot arm 232B, another example in which one 3D vision camera 234 is disposed at the end portion of the first robot arm 232A as in FIG. 4A and one two-dimensional (2D) or 3D vision camera 234 is additionally disposed at the end portion of the second robot arm 232B as in FIG. 6 may also be possible. In this case, 3D images or 2D images may be collected from various angles through two 3D vision cameras 234 or the 2D and 3D vision cameras, and image calibration for a 3D model obtained through one 3D vision camera 234 may be performed more easily. In addition, since the second robot arm 232B may acquire images while the first robot arm 232A is transporting the fastening device, the fastening situation may be easily determined.

Figure 7:
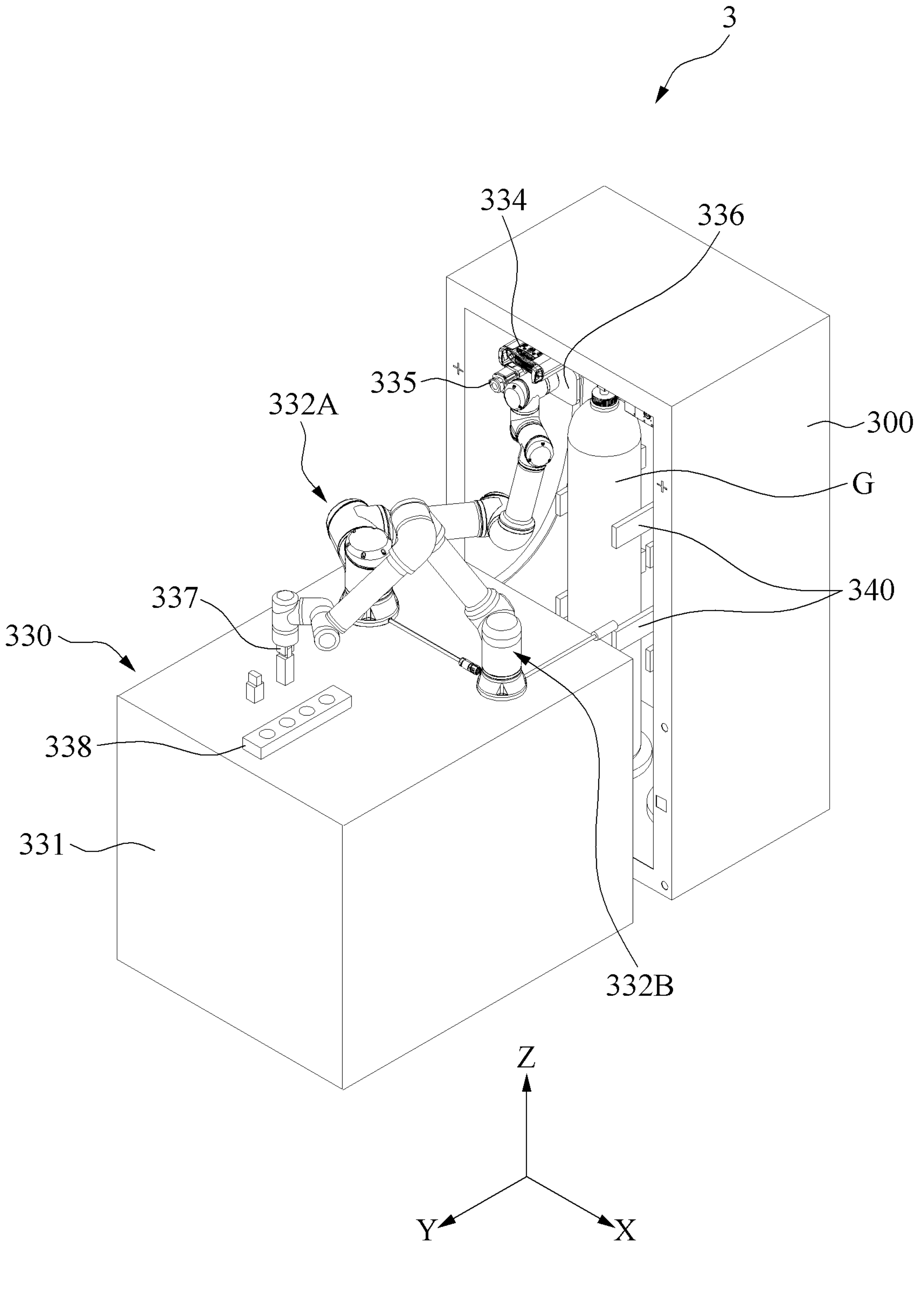
FIG. 7 is a perspective view of a gas supply system according to an embodiment.

FIG. 7 is a perspective view of a gas supply system according to an embodiment.

Unless otherwise stated, the configuration of the gas supply system described above may identically apply to the gas supply system shown in FIG. 7.

Referring to FIG. 7, a gas supply system 3 according to an embodiment may include a cabinet 300, a position adjustment module, a fastening device (e.g., the fastening device 110 of FIG. 2), and a mobile robot device 330.

In an embodiment, the cabinet 300 may form an internal space where a gas container is disposed. In an embodiment, a support clamp 340 may be disposed in the cabinet 300 to support the outer circumferential surface of the gas container that is safely placed. In an embodiment, a support (not shown) supporting the gas container may be disposed on the floor surface of the internal space of the cabinet 300. In an embodiment, the position adjustment module (e.g., the position adjustment module 120 of FIG. 2) may movably connect the fastening device to the cabinet 300.

In an embodiment, the fastening device may be movably installed in the internal space of the cabinet 300, and may be fastened to a valve of the gas container in a state of being aligned with a valve of the gas container to receive a gas. In an embodiment, the fastening device may include an end cap detacher (e.g., the end cap detacher 111 of FIG. 3B) to remove an end cap mounted on the valve in a state of being aligned with respect to the valve at a first position, and a valve connector (e.g., the valve connector 112 of FIG. 3B) mounted on the valve in a state of being aligned with respect to the valve at a second position to receive a gas. In an embodiment, the fastening device may include a docking portion (e.g., the docking portion 113 of FIG. 3B) connected to the externally positioned mobile robot device 330 and configured to receive power from the mobile robot device 330.

In an embodiment, the mobile robot device 330 may move outside the cabinet 300. The mobile robot device 330 may be connected to the fastening device to move the fastening device, or supply power to the fastening device to operate the fastening device. In an embodiment, the mobile robot device 330 may include a body 331, a traveling portion, a first robot arm 332A, a second robot arm 332B, a docking module 336, a 3D vision camera 334, a gasket gripper 337, a gasket storage 338, and a controller.

In an embodiment, the body 331 may form the body of the mobile robot device 330. In an embodiment, the traveling portion may be disposed at the lower end of the body 331 to move the body 331 along the ground. In an embodiment, the first robot arm 332A may be disposed on the upper portion of the body 331. In an embodiment, the first robot arm 332A may be configured as a multi-joint arm that implements movement in multiple degrees of freedom, for example, movement in six degrees of freedom.

In an embodiment, the docking module 336 may be disposed at an end portion of the first robot arm 332A. In an embodiment, the docking module 336 may be connected to a docking portion of the fastening device through the operation of the first robot arm 332A. The docking module 336 may be connected to the docking portion to provide power to operate the fastening device.

In an embodiment, the second robot arm 332B may be positioned on the upper portion of the body 331. In an embodiment, the second robot arm 332B may be configured as a multi-joint arm that implements movement in multiple degrees of freedom, for example, movement in six degrees of freedom.

In an embodiment, the 3D vision camera 334 may be disposed at an end portion of at least one of the first robot arm 332A or the second robot arm 332B to collect 3D images including the docking module 336, the fastening device, and the valve of the gas container.

In an embodiment, the gasket gripper 337 may be installed at an end portion of the second robot arm 332B. In an embodiment, the gasket gripper 337 may move and operate to replace a gasket mounted between the valve and the valve connector by means of the second robot arm 332B. For example, the gasket gripper 337 may move between a gasket replacement position set by the second robot arm 332B and the gasket storage 338. For example, the gasket gripper 337 may operate to grip a discarded gasket at the gasket replacement position or to grip a new gasket and move to the gasket replacement position.

In an embodiment, the controller may determine a gasket replacement position for replacing a gasket based on the images collected by the 3D vision camera 334, and control the operation of the second robot arm 332B to move the gasket gripper 337 to the determined gasket replacement position.

In an embodiment, the gasket storage 338 may be disposed on the upper portion of the body 331. In an embodiment, the gasket storage 338 may include a wasted gasket storage box to accommodate wasted gaskets removed from the valve through the gasket gripper 337, and a new gasket storage box to store new gaskets to be gripped by the gasket gripper 337.

Hereinafter, a gas supply method through an automated gas supply system according to an embodiment will be described. In describing the gas supply method, the description provided above will not be repeated.

Figure 8:
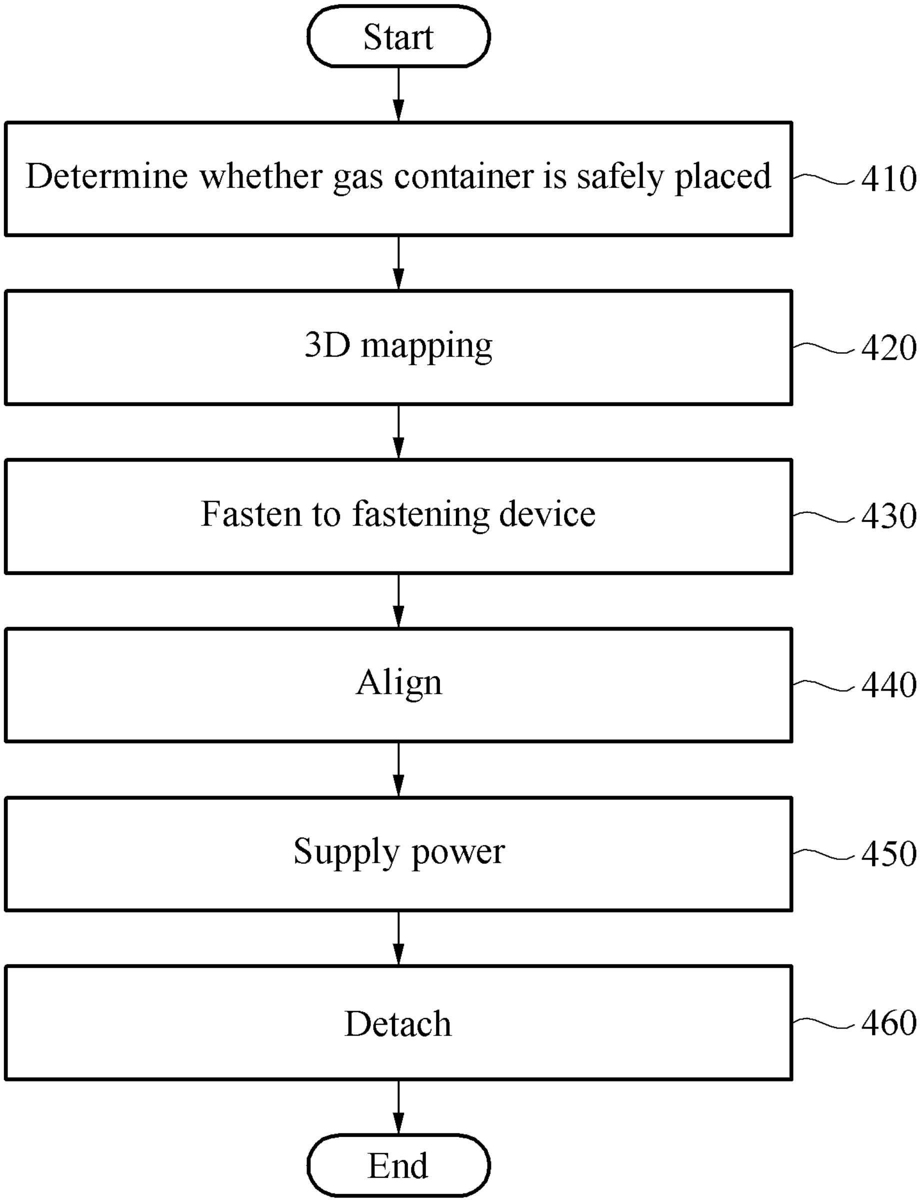
FIG. 8 is a flowchart of a gas supply method according to an embodiment.

FIG. 8 is a flowchart of a gas supply method according to an embodiment.

At least one of the operations of the gas supply method shown in FIG. 8 may be omitted. The operations of the gas supply method may performed in a different order or at the same time, unless otherwise specified. At least one of the operations of the gas supply method may be performed repeatedly.

The gas supply method according to an embodiment may be performed by a gas supply system (e.g., the gas supply system 1 of FIG. 2) including a fastening device and a mobile robot device including a docking module optionally connected to the fastening device to supply power to the fastening device. In an embodiment, the fastening device may include a valve connector fastened to a valve of a gas container to receive a gas, or an end cap detacher. In an embodiment, the mobile robotic device may include the docking module that is optionally connected to a docking portion of the fastening device to supply power to the fastening device. In an embodiment, the gas supply method may be performed by a controller.

In an embodiment, the gas supply method may include operation 410 of determining whether a gas container is safely placed. In operation 410, whether a gas container is safely placed at a gas supply position, for example, whether a gas container is safely placed in a safe placing space in a cabinet.

In an embodiment, the gas supply method may include operation 420 of generating a 3D model for the gas supply system. In operation 420, the docking module may be aligned by generating a 3D model of a virtual space according to relative positions of the gas container, the fastening device, and the docking module.

In an embodiment, operation 420 may include an operation of collecting a 3D image through a 3D vision camera, an operation of generating a 3D model for a virtual space based on the collected image, an operation of determining an image similarity by comparing the generated 3D model with a set reference model, and an operation of determining a predicted position of the docking module at which the image similarity is greater than or equal to a set value if the image similarity is less than the set value.

In an embodiment, the operation of generating a 3D model may vary depending on a real-time 3D image acquired by the vision camera.

In an embodiment, the operation of determining an image similarity may determine the image similarity by comparing a generated 3D image with the set reference model. For example, the set reference model may be a 3D model in a state in which the fastening device is aligned in a first state with respect to the gas container valve. For example, the set reference model may be a 3D model in a state in which the fastening device is aligned in a second state with respect to the gas container valve. In an embodiment, the operation of determining an image similarity may include determining the need for position adjustment of the docking module by determining the image similarity between the generated 3D image and the set reference model.

In an embodiment, the operation of determining an image similarity may include determining a subsequent operation determined according to the reference model if the image similarity is greater than or equal to the set value. For example, if the reference model is a 3D model in which the docking module is aligned to be fastenable to the docking portion, the subsequent operation corresponding to the image similarity greater than or equal to the set value may be an operation of fastening the docking module to the docking portion. For example, if the reference model is a 3D model in a state in which the fastening device is aligned in the first state with respect to the valve, the subsequent operation corresponding to the image similarity greater than or equal to the set value may be an operation of removing an end cap from the valve by the end cap detacher. For example, if the reference model is a 3D model in a state in which the fastening device is aligned in the second state with respect to the gas container valve, the subsequent operation corresponding to the image similarity greater than or equal to the set value may be an operation of fastening the valve connector to the valve.

In an embodiment, the operation of determining a predicted position of the docking module at which the image similarity is greater than or equal to a set value if the image similarity is less than the set value may include an operation of predicting a position of the docking module at which the 3D model has an image similarity to the reference model greater than or equal to the set value, and an operation of determining the predicted position to be an alignment position of the docking module.

In an embodiment, the gas supply method may include operation 430 of docking the docking module to the fastening device. Operation 430 may be performed when it is determined that the image similarity between the reference model for a state in which the docking module is fastenable to the fastening device and the generated 3D model is greater than or equal to the set value.

In an embodiment, the gas supply method may include operation 440 of operating the mobile robot device so that the fastening device is aligned with the gas container valve after the docking module is fastened to the fastening device.

In an embodiment, operation 440 may be performed by determining the alignment position of the docking module by determining the similarity between the reference model in the state in which the fastening device is aligned in the first state with respect to the valve and the generated 3D image. Operation 440 may include aligning the fastening device integrally connected to the docking module to be in the first state, by operating the mobile robot device to move the docking module to the determined alignment position of the docking module.

In an embodiment, operation 440 may be performed by determining the alignment position of the docking module by determining the similarity between the reference model in the state in which the fastening device is aligned in the second state with respect to the valve and the generated 3D image. Operation 440 may include aligning the fastening device integrally connected to the docking module to be in the second state, by operating the mobile robot device to move the docking module to the determined alignment position of the docking module.

In an embodiment, the gas supply method may include operation 450 of supplying power to the fastening device through the docking module. In an embodiment, operation 450 may be performed in a state in which the fastening device is aligned in the first state or the second state with respect to the valve.

In an embodiment, the gas supply method may include operation 460 of detaching the docking module from the fastening device.

A number of embodiments have been described above. Nevertheless, it should be understood that various modifications and variations may be made to these embodiments. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and/or equivalents of the claims are within the scope of the following claims.

What is claimed is:

1. A gas supply system comprising:

a cabinet in which a gas container is disposed;

a fastening device configured to detach an end cap from a valve of the gas container or fasten a valve connector to the valve of the container; and a mobile robot device disposed outside the cabinet and connected to the fastening device to operate the fastening device, wherein the mobile robot device comprises:

a body movable along a ground;

a first robot arm installed on the body, the first robot arm having a multi-degree-of-freedom motion;

a docking module disposed at an end portion of the first robot arm and detachably fastened to the fastening device;

a three-dimensional (3D) vision camera configured to collect an image; and a controller configured to control an operation of the first robot arm based on the image collected by the 3D vision camera, wherein the controller is configured to determine one or more alignment positions of the docking module according to a set algorithm, and control an operation of the first robot arm so that the docking module is positioned at the determined one or more alignment positions, and the set algorithm is configured to generate in real time a 3D model of the gas supply system in a virtual space based on the image collected through the 3D vision camera, determine an image similarity by comparing the generated 3D model of the gas supply system with a set reference model, and determine a predicted position of the docking module at which the image similarity is greater than or equal to a set value to be an alignment position of the docking module.

2. The gas supply system of claim 1, wherein the controller is configured to adjust 3D coordinates and a 3D rotation angle of the docking module by operating the first robot arm so that the docking module is positioned at the determined alignment position.

3. The gas supply system of claim 1, wherein the docking module is fastenable to the fastening device in a fastening state of being relatively aligned with respect to the fastening device, and the controller is configured to determine a first alignment position at which the docking module is in the fastening state with respect to the fastening device, during a process of connecting the docking module to the fastening device.

4. The gas supply system of claim 1, wherein the fastening device is configured to detach the end cap from the valve or mount the end cap on the valve, in a first state of being relatively aligned with respect to the valve of the gas container, and the controller is configured to determine a second alignment position of the docking module at which the fastening device is in the first state, in a state in which the docking module is fastened to the fastening device.

5. The gas supply system of claim 1, wherein the fastening device is configured to fasten the valve connector to the valve of the gas container to receive a gas in a second state of being relatively aligned with respect to the valve of the gas container, and the controller is configured to determine a third alignment position of the docking module at which the fastening device is in the second state, in a state in which the docking module is fastened to the fastening device.

6. The gas supply system of claim 1, wherein the fastening device comprises a docking portion disposed to be exposed on an outer surface of the fastening device so that the docking module is fastened thereto, wherein the docking module comprises:

a docking plate;

a docking member disposed on a docking surface of the docking plate and fastened to the docking portion; and a power motor configured to supply power to the fastening device, in a state in which the docking module is fastened to the docking portion.

7. The gas supply system of claim 6, wherein the docking portion comprises:

a docking clamp to which the docking member is inserted and fastened; and a power transmitter into which a rotation shaft of the power motor is inserted, the power transmitter configured to receive power from the power motor.

8. The gas supply system of claim 6, wherein the 3D vision camera is disposed at an end portion of the first robot arm, and configured to acquire a front view image of the docking module that the docking surface of the docking plate faces.

9. The gas supply system of claim 1, wherein the mobile robot device further comprises:

a second robot arm installed on the body, the second robot arm having a multi-degree-of-freedom motion, wherein the 3D vision camera is disposed on the second robot arm.

10. A gas supply system comprising:

a cabinet in which a gas container is disposed;

a fastening device configured to detach an end cap from a valve of the gas container or fasten a valve connector to the valve of the container, in a state of being aligned with the valve of the gas container; and a mobile robot device movable outside the cabinet, wherein the fastening device comprises a docking portion disposed to be externally exposed, and the mobile robot device comprises:

a body movable along a ground;

a first robot arm installed on the body, the first robot arm having a multi-degree-of-freedom motion;

a docking module disposed at an end portion of the first robot arm and detachably fastened to the docking portion in a state of being aligned with respect to the fastening device; and a three-dimensional (3D) vision camera configured to collect images of the gas container, the fastening device, and the docking module, wherein a position of the fastening device is adjusted in response to an operation of the mobile robot device, in a state in which the docking module is fastened to the docking portion, wherein the gas supply system further comprising:

a controller configured to control an operation of the mobile robot device based on the images collected by the 3D vision camera, wherein the controller is configured to determine an alignment position of the docking module according to a set algorithm, and control a first robot arm so that the docking module is positioned in the determined alignment position, wherein the alignment position is one of:

a first alignment position at which the docking module is aligned to be fastened to the docking portion of the fastening device;

a second alignment position of the docking module at which the fastening device is in a first state with respect to the valve of the gas container; and a third position of the docking module at which the fastening device is in a second state with respect to the valve of the gas container.

11. The gas supply system of claim 10, wherein the fastening device further comprises:

an end cap detacher configured to detach the end cap from the valve of the gas container or mount the end cap on the valve of the container, wherein the end cap detacher is rotatable about a first rotation axis, and the valve connector is rotatable about a second rotation axis.

12. The gas supply system of claim 11, wherein the first rotation axis coincides with a central axis of the valve of the gas container in a state in which the fastening device is aligned in a first state with respect to the valve of the gas container, and the second rotation axis coincides with the central axis of the valve of the gas container in a state in which the fastening device is aligned in a second state with respect to the valve of the gas container.

13. The gas supply system of claim 12, wherein the first rotation axis and the second rotation axis are parallel to each other.

14. The gas supply system of claim 11, wherein the first rotation axis and the second rotation axis are the same.

15. The gas supply system of claim 10, wherein the docking module comprises a power motor configured to supply power in a state in which the docking module is fastened to the fastening device, and the docking portion comprises a power transmitter into which a rotation shaft of the power motor is inserted, the power transmitter configured to transmit power from the power motor to the end cap detacher and the valve connector.

16. The gas supply system of claim 10, wherein the set algorithm is configured to generate in real time a 3D model of the gas supply system in a virtual space based on the images collected through the 3D vision camera, determine an image similarity by comparing the generated 3D model with a set reference model, and determine a predicted position of the docking module at which the image similarity is greater than or equal to a set value to be the alignment position.

17. An automated gas supply method through a gas supply system, wherein the gas supply system comprises:

a fastening device configured to detach an end cap from a valve of a gas container or fasten a valve connector to the valve of the gas container; and a mobile robot device comprising a docking module detachably fastened to the fastening device, and a first robot arm configured to move the docking module, and the automated gas supply method comprises:

determining whether the gas container is safely placed at a gas supply position;

aligning the docking module by generating a three-dimensional (3D) model in a virtual space according to relative positions of the gas container, the fastening device, and the docking module;

fastening the docking module to the fastening device based on the generated 3D model; and moving the docking module so that the fastening device is aligned with the valve of the gas container, after the docking module is fastened to the fastening device, wherein the aligning of the docking module comprises:

collecting a 3D image through a 3D vision camera;

generating the 3D model based on the collected 3D image;

determining an image similarity by comparing the 3D model with a set reference model; and determining a predicted position of the docking module at which the image similarity is greater than or equal to a set value, if the image similarity is less than the set value.

* * * * *